United States Patent [19]
Ganske et al.

[11] 4,114,183
[45] Sep. 12, 1978

[54] RECORDING SYSTEM WITH GAS SUPPORTED RECORD MEDIUM

[75] Inventors: Kingston Ganske, Auburn; Earl R. Hibbard, Berkeley; Mervin L. Falk, Sunnyvale; Joseph P. Denk, Newark, all of Calif.

[73] Assignee: Insurance Technology Company, Berkeley, Calif.

[21] Appl. No.: 786,234

[22] Filed: Apr. 11, 1977

[51] Int. Cl.² .............................................. G11B 5/60
[52] U.S. Cl. ...................................... 360/99; 360/102
[58] Field of Search ........................ 360/99, 102, 103; 179/100.3

[56] References Cited

U.S. PATENT DOCUMENTS

| | | | |
|---|---|---|---|
| 3,178,719 | 4/1965 | Shapiro | 360/102 |
| 3,369,227 | 2/1968 | Boissevain | 360/99 |
| 3,537,083 | 10/1970 | Voth | 360/99 |
| 3,842,197 | 10/1974 | Broussaud et al. | 360/102 |
| 3,900,893 | 8/1975 | Hirose et al. | 360/99 |
| 3,980,810 | 9/1976 | Tinet | 360/102 |

FOREIGN PATENT DOCUMENTS

| | | | |
|---|---|---|---|
| 2,336,972 | 6/1975 | Fed. Rep. of Germany | 360/99 |
| 1,441,024 | 6/1976 | United Kingdom | 360/99 |

*Primary Examiner*—John H. Wolff
*Attorney, Agent, or Firm*—Flehr, Hohbach, Test, Albritton & Herbert

[57] ABSTRACT

A recording apparatus of a type employing a thin pliant disc of recording material with a transducer disposed to advance and retreat across the disc in recording relation thereto employs a drive construction for rotating the disc and a base member having a generally smooth crowned surface underlying the disc. The crowned surface includes a radially extending crest defined by flanking portions sloping away from the crest region formed therebetween. The crest extends linearly across the surface (preferably on a radius or diameter) of the disc. Means for rotating the disc relative to the underlying base member in surface following relation causes the recording surface of the disc to be subjected to tensioning forces derived from the conjoint change in angular direction of the disc and the change in the plane of movement of the disc as it passes across the crest region thereby smoothing uneven or irregular portions of the recording surface passing beneath the transducer. In addition, a supplemental supply of suitable gas, such as air, is blown upwardly against the undersurface of the disc along a radius so as to space the disc uniformly from the base member to provide substantially uniform head-to-disc contact.

4 Claims, 11 Drawing Figures

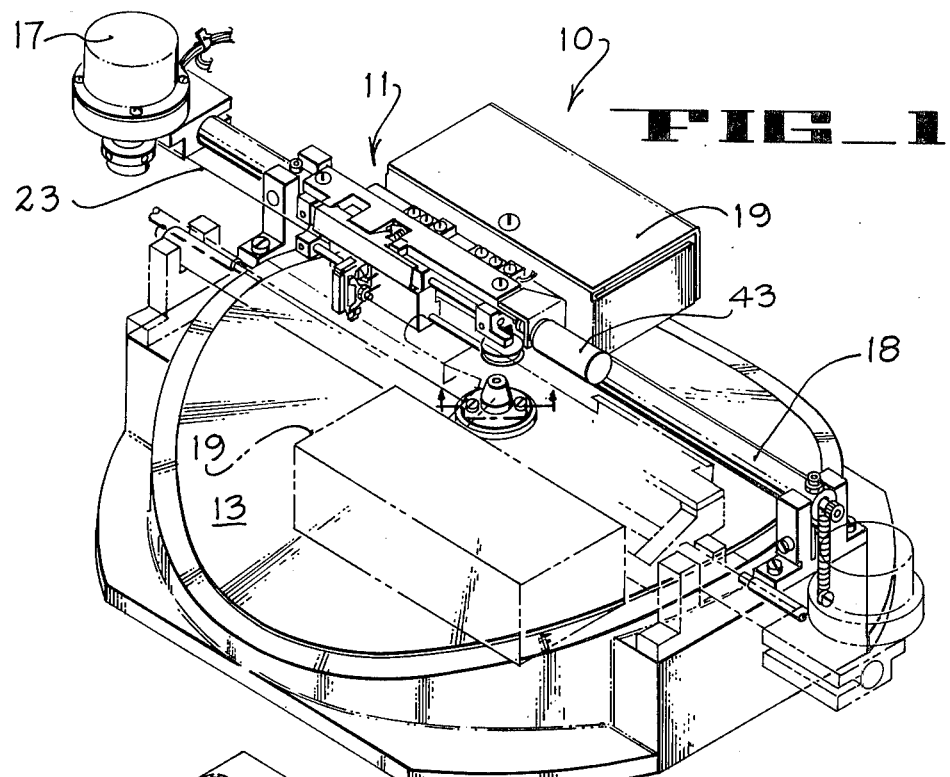
FIG_1
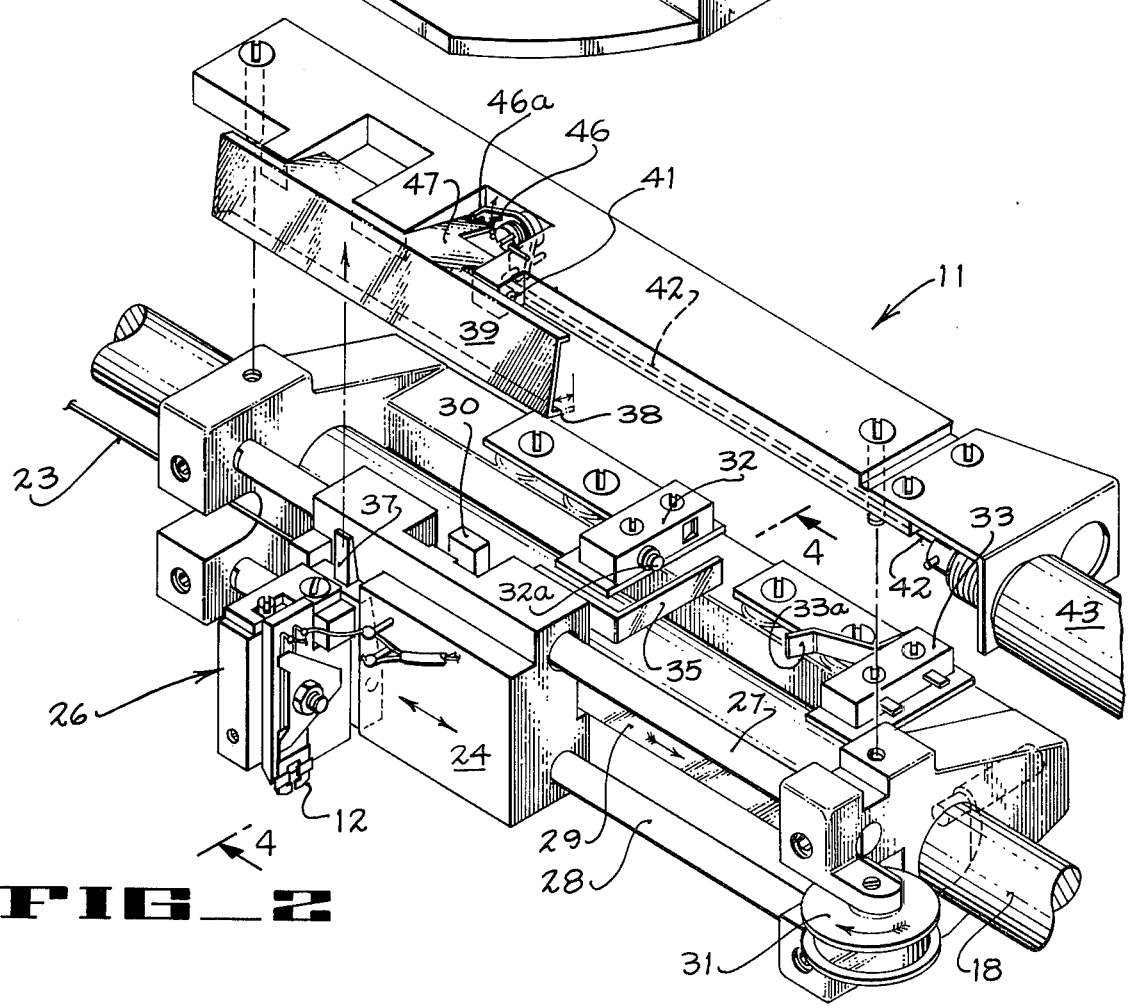
FIG_2

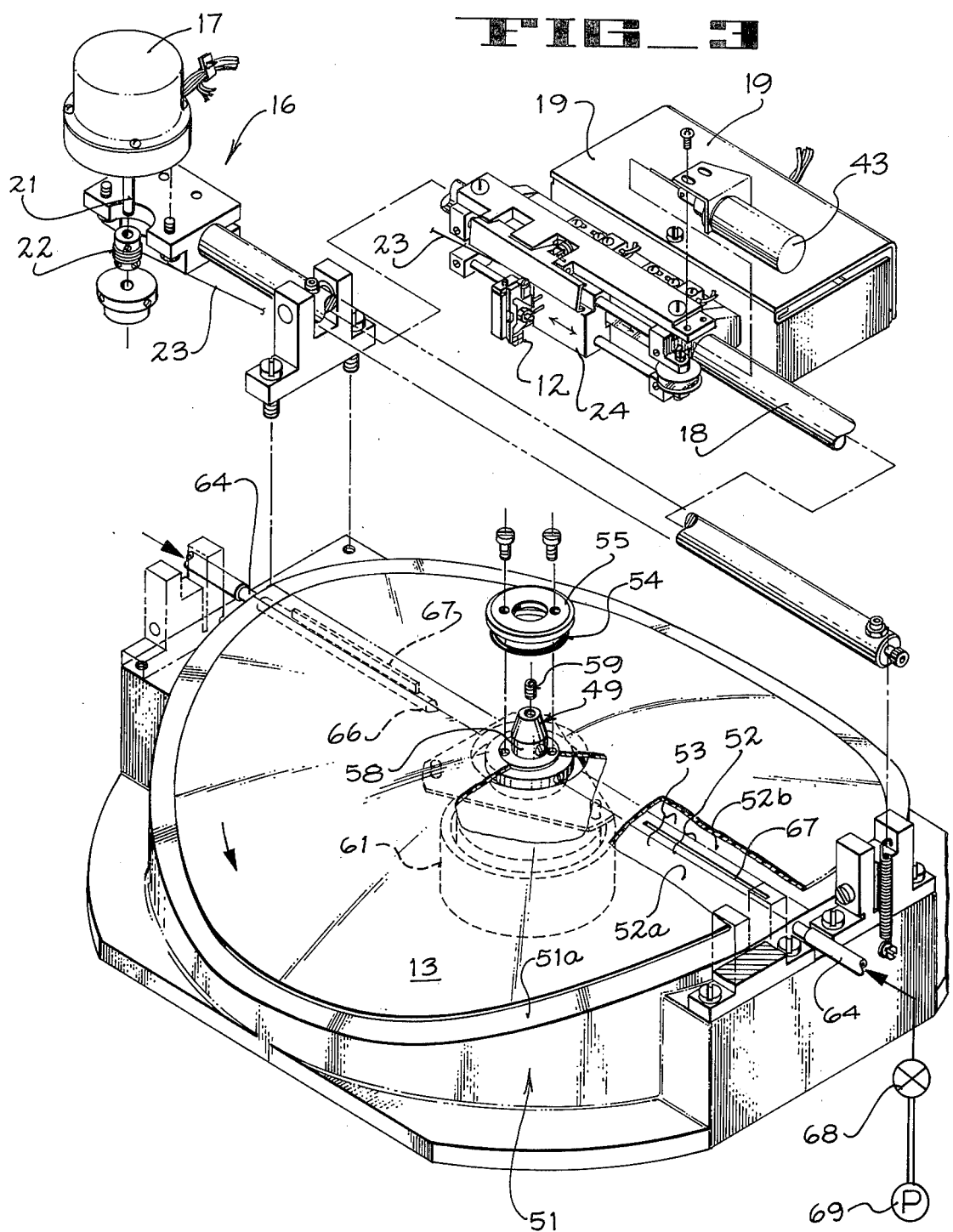

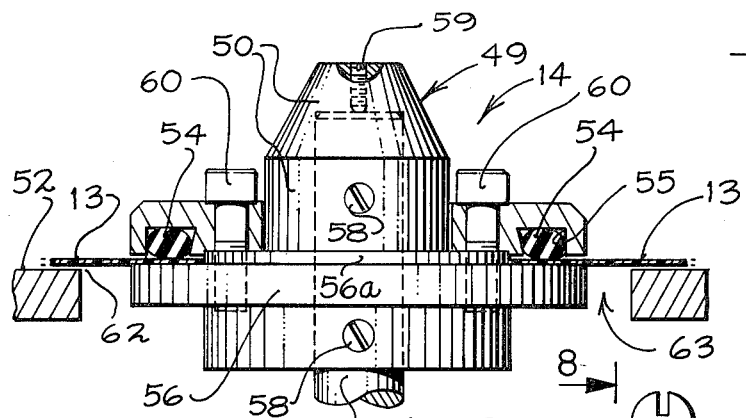
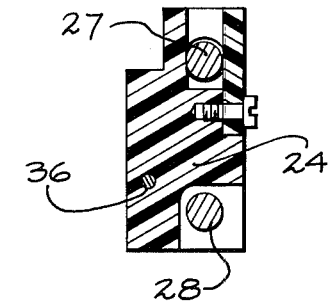
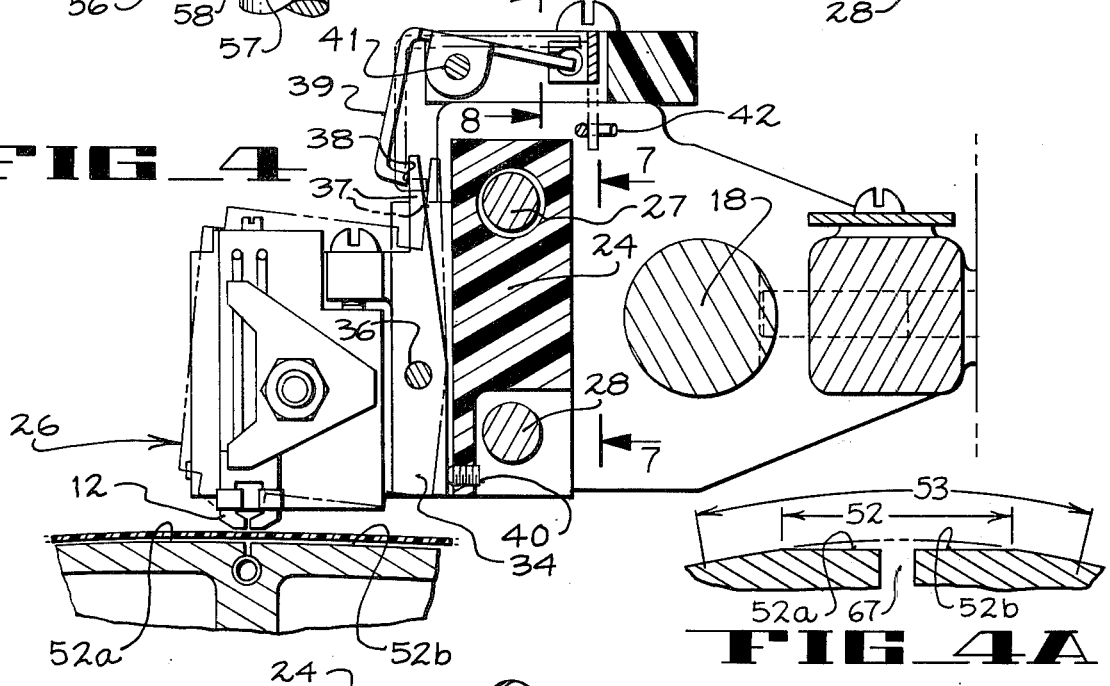
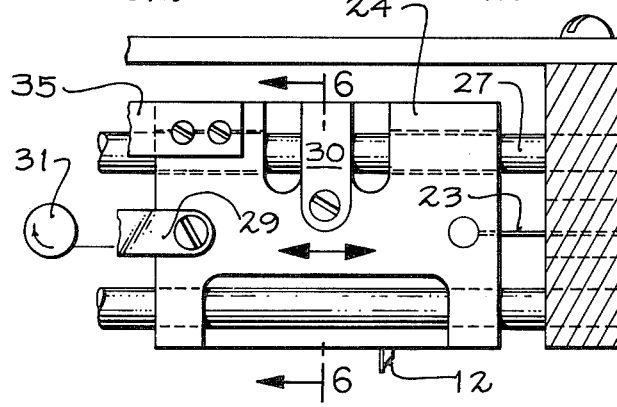
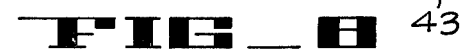

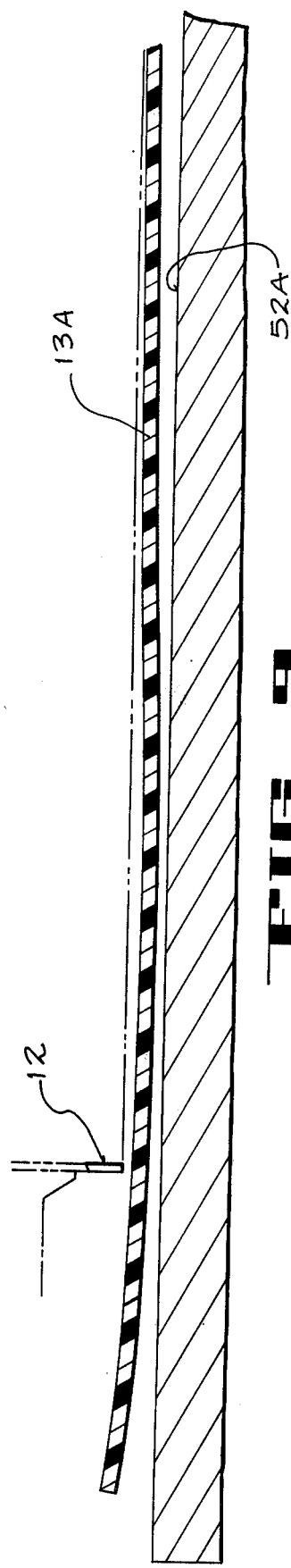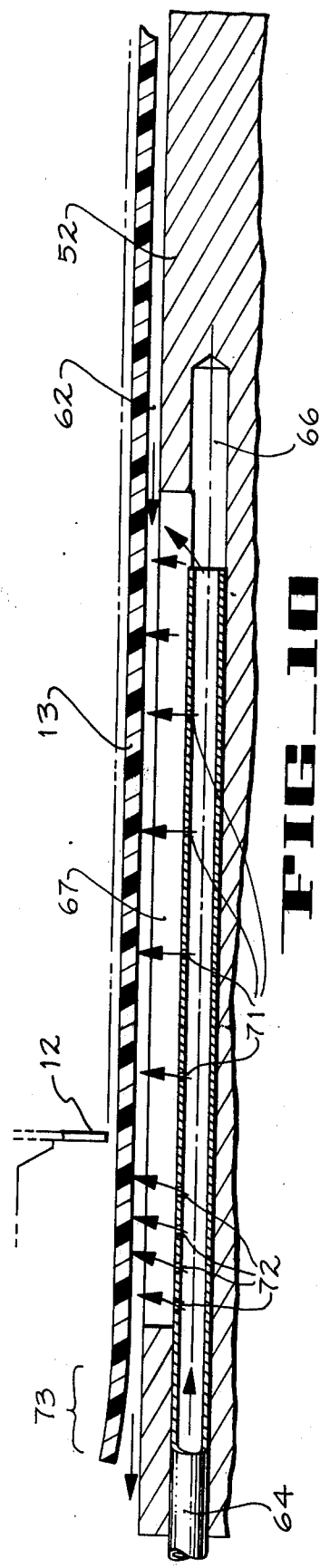

RECORDING SYSTEM WITH GAS SUPPORTED RECORD MEDIUM

BACKGROUND OF THE INVENTION

This invention pertains to a recording system with a gas supported record medium and more particularly to such a system characterized by means for uniformly disposing the record surface of a disc with respect to a transducer operating in cooperation therewith. This invention further particularly provides a gas supported record medium arranged and oriented in a manner to travel a path serving to subject the record surface thereof to a smoothing action in response to conjoint angular and planar changes in direction of the molecules of the disc as it is rotated.

As is known, magnetic recording surfaces of materials, such as magnetic tape material, and pliant discs made from such materials include slight surface irregularities or uneven portions. These irregularities can serve to introduce error in transducing information relative to the recording medium. Common methods used for compensating for this problem have included introduction of increased tape tension (in tape transports) and use of excessive head penetration of the record medium to reach the "valleys". The former solution is generally believed to be unavailable to a rotating disc medium while the latter greatly shortens the life of the recording surface.

According to the present invention, a magnetic record medium is arranged to be moved in a manner which serves to minimize the foregoing irregularities and unevenness and hence serves to improve the performance of the disc recording medium.

In addition, it has been observed that the rotation of a pliant record disc in closely spaced relation to an underlying smooth reference surface introduces irregular or non-uniform spacing along a given radius thereof. Such non-uniform spacing creates difficulties in providing a properly recorded signal on each of a number of concentrically oriented tracks recorded upon the medium.

Accordingly, there has been a need for an improved disc recording system employing a gas-supported record medium in which the medium is substantially uniformly spaced from an underlying reference surface throughout a predetermined lineal or radial extent.

It is further evident that there has been a need to provide a recording system of the kind described in which compensation has been made for irregularities and uneven surface portions of the recording surface. It has been observed that the underlying reference surface, such as provided herein by a large aluminum casting is required to present a very accurate reference foundation for the gas film which supports the disc. However, to manufacture the entire casting surface to such accuracy is quite costly. However, it has been observed that only the operative portion of the underlying casting requires an accurate reference surface finish.

SUMMARY OF THE INVENTION AND OBJECTS

A drive construction for cyclically moving a pliant record medium in a manner serving to smooth uneven portions of the recording surface comprises a base member having a smooth surface underlying and confronting the disc as it rotates. The surface of the base member includes a crowned portion or crest extending linearly across the surface of the base at a location adapted to lie beneath the path of a transducer. The crest is defined by and between flanking portions sloping away from each other. Means for rotating the disc in surface following relation to the crowned surface portion of the underlying base member serves to cause the recording surface of the disc to be subjected to tensioning forces derived from the conjoint change in angular and planar direction of the disc as the disc passes across the crest region. This action smooths uneven portions of the recording surface disposed beneath the transducer. In addition, means for spacing a radius of the disc from the confronting surface of the base member to lie in a substantially flat configuration along the radius includes means for introducing gas under pressure variously beneath the medium along the crest region.

In general it is an object of the present invention to provide an improved magnetic recording system of a type employing a pliant disc and more particularly to provide such a system in which a medium is arranged to move in a manner serving to smooth out uneven surface defects in the recording surface of the medium.

A further object is to provide a magnetic recording system of the kind described in which the medium is disposed in a substantially flat configuration along a predetermined line of movement defined beneath a transducer moving transversely of the direction of movement of the moving medium.

The foregoing and other objects of the invention shall become readily evident from the following detailed description of the invention when considered in conjunction with the drawings.

BRIEF DESCRIPTION OF THE DRAWINGS

FIG. 1 shows a diagrammatic perspective view of a recording system according to the invention;

FIG. 2 shows a diagrammatic perspective view of a transducer control unit forming a portion of the system shown in FIG. 1 according to the invention;

FIG. 3 shows an exploded diagrammatic perspective view of a recording system according to the invention;

FIG. 4 shows an enlarged elevation section view taken along the line 4—4 of FIG. 2;

FIG. 4A shows an enlarged diagrammatic view of a portion of FIG. 4 for ease in explanation;

FIG. 5 shows an enlarged elevation section view taken along the line 5—5 of FIG. 1;

FIG. 6 shows an enlarged detail section view taken along the line 6—6 of FIG. 7;

FIG. 7 shows a diagrammatic view taken along the line 7—7 of FIG. 4;

FIG. 8 shows an enlarged detail section view taken along the line 8—8 of FIG. 4;

FIGS. 9 and 10 respectively show diagrammatic side elevation section views of a portion of a radius of a rotating compliant magnetic disc for explaining a problem and according to the invention solving the problem respectively.

DETAILED DESCRIPTION OF THE PREFERRED EMBODIMENT

A recording system 10 generally includes a transducer control assembly 11 for stepping a magnetic transducer 12 from one concentric track to the next on a cyclically moving record medium 13. Record medium 13 as disclosed herein comprises a disc of magnetic recording material of a type such as magnetic tape for use in tape recorders and the like but formed with a central opening adapted to be received by and locked to a retainer cap assembly 14.

In view of the generally obstructed central region of the rotating medium 13 and in order to be able to record along substantially a diameter of medium 13, a pair of transducer mounting assemblies 16 each characterized by a stepper motor 17, a mounting bar 18 and a transducer control assembly 11 are disposed laterally on opposite sides of a common diameter of disc 13 so as to support their associated transducer elements to move along a radius thereof, the two radii being aligned to substantially form a complete diameter of disc 13.

Each transducer control assembly 11 includes suitable electronics as contained within and represented by the boxes 19 for operating transducers 12.

Means for moving transducers 12 between advanced and retracted positions to align them with a selected one of a number of concentric tracks defined on disc 13 comprises the stepper motor 17 which, via a shaft 21 drives a drum 22 for winding wire 23 therearound.

As shown best in FIG. 2, wire 23 connects to a traveling mounting block 24 supporting transducer assembly 26 and rides along two guide rods 27, 28.

Means urging mounting block 24 to the right (as shown in FIG. 2) includes a substantially constant force spring 29, (such as a Negator* spring) coupled at one end to block 24 and wrapped at its other end about a take-up spool 31. As thus arranged, spring 29 tends to wrap about spool 31 to draw transducer 12 to its radially innermost position while stepper motor 17, through the connection formed by wire cable 23 serves to move transducer 12 in an opposite direction against the urging of spring 29. Limit switches 32, 33 effectively serve to control in known manner the limits of movement of transducer 12 from the innermost track to the outermost track of disc 13.

* Registered Trademark American Machine & Metals, Inc.

Means are provided for lifting transducer 12 free and clear of the surface of disc 13 upon de-energizing the equipment or in response to other circumstances such as controlled by limit switches 32, 33, by power failure, or otherwise. An operator arm 35, carried by mounting block 24 extends therefrom into the path of switch button 32a and the resilient level 33a for operating a similar button (not shown) for controlling limit switches 32, 33 respectively.

Initially it is to be observed that in FIG. 2 the upper portion of the construction has been exploded away from the area of limit switches 32, 33 so as to disclose the construction which is otherwise covered from view. Thus, FIG. 4 discloses an appropriate assembled relationship between the components shown in FIG. 2.

Transducer assembly 26 pivots on a rocker arm 34 mounted upon a pivot pin 36. The upper end of rocker arm 34 includes an extension portion 37 disposed to be engaged by the elongate edge 38 of an operating panel 39 pivoted about the pivot pin 41 and movable between advanced and retracted positions.

Means for so moving operating panel 39 and its associated edge 38 between retracted and advanced positions lower and lifts transducer 12 respectively with respect to the surface of disc 13 and comprises an operating link 42 connected to a solenoid 43 at one end and (as shown in FIG. 8) to a bell crank 44 at its together. Bell crank 44 is arranged whereby one Other. 46 includes a bifurcated end 46a which is bent at right angles to arm 46 to embrace the edge of a generally flat lever portion 47 (FIG. 2) extending laterally of and integral with panel 39 whereby as arm 46 of bell crank 44 moves down with level portion 47, panel 39 will move edge 38 away from the traveling mounting block 24 and end portion 37 of rocker arm 34 to permit transducer 12 to pivot downwardly toward the surface of disc 13 about pivot pin 36.

Upon de-energizing solenoid 43, a spring 48 rotates bell crank 44 clockwise whereby the bifurcated end portion 46a of arm 46 serves to lift level portion 47 to move panel 39 and edge 38 toward mounting block 24 for engaging the upwardly extending portion 37 of rocker arm 34 which lifts transducer 12 from the surface of disc 13.

Accordingly, as described above, there has been shown a pliant record medium in the form of a rotating disc 13 having a transducer 12 disposed to advance and retreat across the disc in cooperative relation therewith for transducing signals between transducer and the medium. As now to be described, means for supporting the medium relative to the transducer comprises a drive construction and base assembly 51. Base 51 is formed as a surface portion of a cylinder and includes a crest portion 53 ground generally smooth. Then a radial strip 52 is finely ground and flattened to establish a basic reference surface since transducer 12 travels in a plane. Thus, the top surface of base 51 is characterized by a smooth flat radial surface 52 underlying disc 13. Surface 52 includes portions 52a, 52b (FIG. 4A) providing a flattened top to crest 53 extending linearly across surface 52, preferably on a radius or diameter thereof, to provide a finely, easily and inexpensively ground reference surface.

The movement of disc 13 in surface following relation first upwardly and then downwardly as it travels across crest region 53 serves to cause a change in direction of the plane of movement of the recording surface molecules.

It has been observed that this change of movement in the plane of the recording surface as it passes across crest 53 serves to apply a smoothing force to the recording surface tending to reduce irregularities otherwise found in the recording surface beneath transducer 12, and in combination with the angular change in direction of the surface produces an improved pliant recording surface smoothness.

As noted above disc 13 consists of a thin pliant recording material on the order of magnetic tape structure as contrasted to other rotating discs of a more rigid nature. Accordingly, means for controlling the movements of this pliant material as it is rotated at high speed, (for example for purposes of obtaining video reproduction therefrom) comprises means for introducing a flowing film of gas, such as air, in response to rotation of disc 13.

A retainer cap assembly 14 serves to mount disc 13 centered thereon for rotation and driven by motor 61. Assembly 14 comprises a hub member 49 having a generally frusto-conically topped body 50 for receiving a disc 13 thereover. Hub 49 further comprises a flange 56 and a circular centering pad 56a formed concentrically as a portion thereof for aligning the center opening of a disc 13 snugly disposed therearound.

An O-ring 54 disposed within an annular retaining cap opening 55, presses against disc 13 to hold it in place under the clamping action of Allen screws 60.

Means for adjusting the spacing 62 (FIG. 10) between disc 13 and reference surface 52 includes an Allen screw 59 disposed axially of drive shaft 57 for slightly moving assembly 14 along shaft 57. When proper spacing 62 is established, set screws 58 are tightened against shaft 57 so as to lock assembly 14 to rotate with shaft 57.

Means for mechanically pumping air into the spacing 62 defined between disc 13 and surface 52 includes the annular opening 63 surrounding flange 56. As thus arranged as disc 13 rotates air is drawn upwardly through opening 63 by the frictional drag of disc 13 acting thereon and the centrifugal force of the disc tends to "throw" the air outwardly to its periphery.

Means for orienting transducer 12 to a precise position relative to disc 13 comprises a retainer plate 30, held by screws to the mounting block 24. Plate 30 applies a slight pressure to guide rod 27, and thereby precisely adjusts the orientation of block 24 (otherwise pivotable about rod 28) and the position of head 12 since imperfect mounting of block 24 can introduce error in the disposition of head 12. An adjustable screw 40 forms a limit stop for rocker arm 34 to establish the downwardmost (vertical) position of head 12.

Means have been provided for introducing a gas, such as air, under pressure beneath disc 13 along the crest region 53 so as to space the medium from reference surface 52 of base 51 substantially uniformly along the operative length of crest region 53.

Thus, it has been observed (as shown in FIG. 9) that a disc 13a, when rotated as above described but without benefit of a supplemental air supply, remains somewhat nonuniformly spaced from its associated reference surface 52a. Accordingly, since transducer 12 will move in a precise plane the spacing between transducer 12 and the surface of disc 13a will vary throughout the range of movement of transducer 12.

As air or other gas is discharged radially outwardly of the rotating disc (between disc and top surface of base 51) the moving gas creates a Bernoulli effect which causes the disc to remain operably close to the crowned surface such as the top of base assembly 51.

The term "crowned surface" as used herein shall be deemed to mean an upwardwardly arched surface formed with an elongate crest which, when the disc is at rest, underlies a diameter of the record. It has been observed, however, that since the volume of air supplied into the spacing between the disc and its associated reference surface will remain substantially constant while the region into which the air is charged becomes progressively larger at greater radial distances from the axis of rotation, the Bernoulli effect will tend to be dissipated or diminished at the radially outer positions whereby, for example, the outer edge margin can become somewhat unstable and unsatisfactory for reliable use.

As disclosed herein, means are provided for generally distributing the volume of air evenly substantially throughout a radius of the disc as now to be explained.

Means for introducing a supplemental flow of gas or air under pressure locally beneath medium 13 comprises the supply tube 64 coupled by means of a closure member or valve 68 to a pump 69. Tube 64 is inserted into an elongate drilled hole 66 formed on a radius of the crowned surface of base 51 and lying immediately beneath the discharge slit 67. Tube 64 extends nearly sufficiently into the drilled hole 66 so as to leave a short length of the discharge slit 67 available for discharging gas from the inner open end of tube 64.

Tube 64 further includes an inner plurality of flow passages 71 and a radially outer plurality 72. Accordingly, gas supplied via tube 64 serves to supplement the flow of "mechanically pumped" gas from opening 63 (FIG. 5), represented by arrow 75. In addition, the volume of gas flow from flow passages 72 serves to supplement the dissipating volume of gas flow from passages 71 and opening 63 so as to maintain the outer edge margin 73 closer to reference surface 52 and in a more stable condition whereby transducer 12 can effectively and reliably operate throughout a greater radius of the disc.

From the foregoing it should be readily evident that there has been provided an improved recording system whereby irregularities appearing on the otherwise uneven recording surface are "stretched" into a relatively smooth condition by subjecting the recording surface of disc 13 to tensioning forces derived from the conjoint changes in both the angular direction of the disc and in the plane of movement of the disc as it passes across the crest region 53.

Further by providing a supplemental air supply via the slit 67 the disc surface is maintained substantially flat and straight throughout the limits of movement of transducer 12 radially of disc 13. In this way the head to disc engagement can be reliably established for all tracks of the disc. The supplemental air supply also provides additional spacing between the head and the surface of the reference crest region 53. This reduces manufacturing and stability requirements.

Accordingly, provision of thicker air films permits wider allowable production and thermal tolerances.

Further, even with fixed heads it remains easy to adjust the head/disc interface pressure by simply adjusting the air supply.

It should also be evident that since the only high precision is required on the crest region 53, production costs will be significantly lower.

While not referred to above at length multiple slits and associated crest regions are shown. It is to be understood that the function and operation of all correspond to the arrangement described.

What is claimed is:

1. In a recording system of a type employing a pliant recording disc and transducer means disposed to advance and retreat across the disc in cooperative relation therewith for transducing signals between the transducer and the disc, means for moving and supporting the disc relative to the transducer comprising a base member having a surface underlying the disc, said surface including a crest region beneath the path of the transducer defined by flanking crowned surface portions sloping away from said crest region, said crest including a flat radially extending surface serving to form a reference surface beneath the disc, said flat radially extending surface including therewithin an elongate slit means for supplying gas to the underside of the disc via the slit, means for moving the disc in surface-following relation across said crest region to cause a change in direction of the plane of the recording surface as it passes across said crest to apply a smoothing force to the recording surface.

2. In a recording system according to claim 1, further comprising means for introducing a gas under pressure beneath the disc along said crest so as to support the disc from the surface of said base member to lie in a substantially straight configuration along the crest stretched smooth across said crest.

3. In a recording system according to claim 1, comprising an elongate opening extending along said crest, closure means for closing said opening in varying degree for controlling the flow of gas through a flow passage formed between said opening and said closure member, and means serving to supply gas under pressure via said flow passage to be discharged along said opening to support said disc thereabove.

4. In a recording system of a type employing a thin, pliant disc of recording material, a transducer disposed to advance and retreat across the disc in cooperative relation therewith, and means for so moving the transducer to advance and retreat across the disc, a disc drive construction comprising a base member having a surface underlying said disc, said surface including at least two arched surface portions sloping away from each other to form a crest region therebetween, said crest region extending linearly across said surface beneath said transducer, said crest including an elongate flat surface extending radially of said disc between said two arched surface portions to define a reference surface beneath the transducer, and a slit extending centrally within and along said flat surface forming a flow passage in said flat surface for discharging gas under pressure against the underside of the disc to support said disc thereabove, means for rotating the disc relative to the underlying base member in surface-following relation to cause the recording surface of the disc to be subjected to tensioning forces deriving from the conjoint change in angular direction of the disc material and in the plane of movement of the disc material as it passes across said crest thereby smoothing uneven portions of the recording surface beneath said transducer.

* * * * *